United States Patent [19]
Menez et al.

[11] Patent Number: 5,629,737
[45] Date of Patent: May 13, 1997

[54] METHOD AND APPARATUS FOR SUBBAND CODING VIDEO SIGNALS

[75] Inventors: Jean Menez, Cagnes-sur-Mer; Michele Rosso, Saint-Jeannet; Paolo Scotton, Vence, all of France

[73] Assignee: International Business Machines Corporation, Armonk, N.Y.

[21] Appl. No.: 405,727

[22] Filed: Mar. 17, 1995

Related U.S. Application Data

[63] Continuation of Ser. No. 28,871, Mar. 10, 1993, abandoned.

[30] Foreign Application Priority Data

Jun. 30, 1992 [EP] European Pat. Off. .............. 92480095

[51] Int. Cl.$^6$ ...................................................... H04N 7/12
[52] U.S. Cl. ............................................ 348/398; 348/397
[58] Field of Search ................................... 348/398, 384, 348/397, 410, 414, 417–419, 422; H04N 7/12

[56] References Cited

U.S. PATENT DOCUMENTS

| | | | |
|---|---|---|---|
| 4,713,776 | 12/1987 | Araseki | 348/398 |
| 4,829,378 | 5/1989 | LeGall | 348/397 |
| 4,943,855 | 7/1990 | Bheda et al. | 348/398 |
| 4,969,040 | 11/1990 | Gharavi | 358/136 |
| 4,987,480 | 1/1991 | Lippman et al. | 348/398 |
| 5,128,757 | 7/1992 | Citta et al. | 348/398 |
| 5,136,374 | 8/1992 | Jayant et al. | 348/398 |
| 5,235,420 | 8/1993 | Gharavi | 358/136 |
| 5,309,232 | 5/1994 | Hartung et al. | 348/384 |
| 5,337,085 | 8/1994 | Lee et al. | 348/398 |

FOREIGN PATENT DOCUMENTS

| | | | |
|---|---|---|---|
| 0396368 | 5/1989 | European Pat. Off. | H04N 1/38 |
| 0464591 | 1/1992 | European Pat. Off. | H04N 7/133 |
| 0479432 | 4/1992 | European Pat. Off. | H04N 7/13 |

OTHER PUBLICATIONS

"Still–Image Coding Using Predictive Tree–VQ with Sub–band Decomposition", Jens–Rainer Ohm, IEEE 1990.

"Temporal Domain Sub–band Video Coding with Motion Compensation", Jens–Rainer Ohm, IEEE 1992.

"Sub–band Imaging Coding with Incorporating HVS Model", Hui et al, IE, 1992 Int'l Symposium.

"Perceptually Tuned Sub–band Image Coder with Image Dependent Quantization and Post–Quantittion Data Compression", Safronek et al, IEEE 1989.

"Subhand Coding Using Human Visual Characteristics for Image Signals", Kim et al, IEEE Journal on Selected Areas in Comm., vol. 11, No. 1, Jan. 1993, pp. 59–64.

"Transmission of Subhand–Gled Images in a Mobile Channels", Stedman et al, IEEE Trans. on Cir & Systems for Video Tech., vol. 3, No. 1, Feb. 1993, pp. 15–26.

"Subband Coding Algorithms for Video Applications, Videophone to HDTV–Conferencing", Ghargvi, IEEE Transactions on Circuits & Systems for Video Tech, vol. 1, No. 2, Jun. 91.

"Teilbandcodierung Von Bewegtbild–Sequenzen MIT 2 MBITS/S", Frequenz, vol. 40, No. 8, Aug. 31, 1988, New York, by Von Achim V. Brandt, pp. 190–197.

"Sub–Band Coding of Monochrome and Color Images" by H. Gharavi et al., IEEE Transactions on Circuits and Systems, vol. 35, No. 2, Feb. 28, 1988, New York, pp. 207–214.

(List continued on next page.)

*Primary Examiner*—Howard W. Britton
*Assistant Examiner*—Vu Le
*Attorney, Agent, or Firm*—John J. Timar; Edward H. Duffield

[57] ABSTRACT

Technique for coding video images by filtering the original input image into subband images using successive high-pass and low-pass filterings over a tree-shaped filter bank. Each subband image is then submitted to activity detection and coded with a different number of levels depending on the activity detected and on the subband involved.

10 Claims, 6 Drawing Sheets

OTHER PUBLICATIONS

"Subband Coding of Images" by J. Woods et al, IEEE Transactions on Acoustics, Speech & Signal Processing, vol. 34, No. 5, Oct. 31, 1986, pp. 1278–1288.

"Codeurs Video de Faible Complexite a Base De Codage En Sous–Bandes, De Compensation De Mouvement Hierarchisee Et De Quantifcation Vetorielle", by G. Furlan et al., Treiziene Colloque Gretsi, Sep. 20, 1991, Juan–Les–Pins–Fr, pp. 857–860.

"Recursive Subband Image Coding with Adaptive Prediction and Finite State Vector Quantization" by P. Jeanrenaud et al, Signal Processing, vol. 20, No. 1, May 31, 1990, Amsterdam NL, pp. 25–45.

METHOD AND APPARATUS FOR SUBBAND CODING VIDEO SIGNALS

This is a continuation of Ser. No. 08/028,871, filed on Mar. 10, 1993, now abandoned.

TECHNICAL BACKGROUND

The invention relates to a method for efficiently coding video signals and is more particularly directed to a method for performing said coding using Subband Coding (SBC) techniques and to a device for implementing said method.

PRIOR ART

Today one of the major goals in the world of telecommunications is the realization of a single world-wide, high speed integrated broadband communication (IBC) network. Most of recent efforts are being made to develop multimedia digital networks wherein voice, images and data, at different rates, are to be transmitted together, using common facilities. This could be achieved using convenient and efficient digital coding techniques.

Therefore, efficient methods for digitally coding video signals are obviously of increasing interest in a world wherein communication is a key item.

One of the basic problems to be solved lies in the tremendous flow of bits generated through the coding of image or video signals. Methods have been proposed for "compressing" said bit flow, without impairing, on the image quality obtained at the decoding of the coded video signals. But cost efficiency is also a key item, and improved methods for achieving efficient coding at reasonable cost are of particular interest. This goal may be achieved by reducing the image signal processing complexity.

Subband Coding (SBC) is a powerful coding technique that presents some interesting properties like its continuous frequency analysis and its ability to be used in progressive and multirate schemes.

First applied to speech compression, Sub Band Coding (SBC) is now quite a popular technique for image compression ("Subband Coding of Images" by John W. Woods, in IEEE Transactions on Acoustics, Speech and Signal Processing, Vol. ASSP-34, N-5, October 1986) and video compression ("Three-dimensional Sub-band Coding of Video" by G. Karlsson and M. Vetterli, in IEEE ICASSP 1988).

SBC consists in splitting up the frequency bandwidth of the original signal into sub-sampled subband signals, that are subsequently separately quantized.

Several methods have been proposed for encoding each subband signal, which are sub-optimal in terms of efficiency.

Actually, these methods do not take into account differential image properties. In fact, a time prediction error picture is representative of motion between time t and t+1. So, if the scene is not completely different, the image contains two types of areas:

Areas with no motion which are uniform (currently named background).

Areas with activity (currently named active areas).

However, a simple observation of subband signals shows that active areas are prevailing in high frequency subbands. Low frequencies (i.e. the lowest subband) contain information about uniform or slowly varying areas, while high frequencies (i.e. other subbands) represent contours. Thus, uniform subband encoding reveals to be a sub-optimal technique regarding the coder bit-rate and quality. It is easy to understand that one should encode as precisely as possible contours appearing in high frequency subbands and less precisely—or, in some cases, not at all—background.

A second observation that can be made on subband decomposed images is that there is some correlation between subband signals. For example, within the same spectral direction and considering a scale factor, the following subbands are highly correlated:

subband 2 with subband 5 subband 4 with subband 7 subband 3 with subband 6

This leads to use the same coding scheme for these subbands.

According to the observation on subband signals, one can think that the SBC coding scheme can be improved using somehow multiresolution quantization. Such a technique allows to suit quantization to the subband model which is defined.

OBJECTS OF THE INVENTION

One object of the invention is to provide an improved and efficient method for coding video signals, based on SBC coding techniques.

Another object of the invention is to provide an improved video subband coding method whereby individual subband signals are conveniently processed prior to being submitted to quantizing, to enable reducing the number of required quantizing levels while keeping a very good visual quality coding scheme.

SUMMARY OF INVENTION

Briefly stated, processing complexity and cost efficiency are achieved through submitting the individual subband signals to convenient activity detection prior to performing subband quantizing operations. The method is based on SBC decomposition and active blocks detection with subsequent allocation of binary resources to the different subbands according to the detected activity and to the subband. Moreover, correlation between subbands is used to reduce the computational complexity due to activity detection.

This and other objects, characteristics and advantages of the invention will be more readily described with reference to attached figures of a preferred embodiment.

DETAILED DESCRIPTION OF PREFERRED EMBODIMENT

Figure 1:
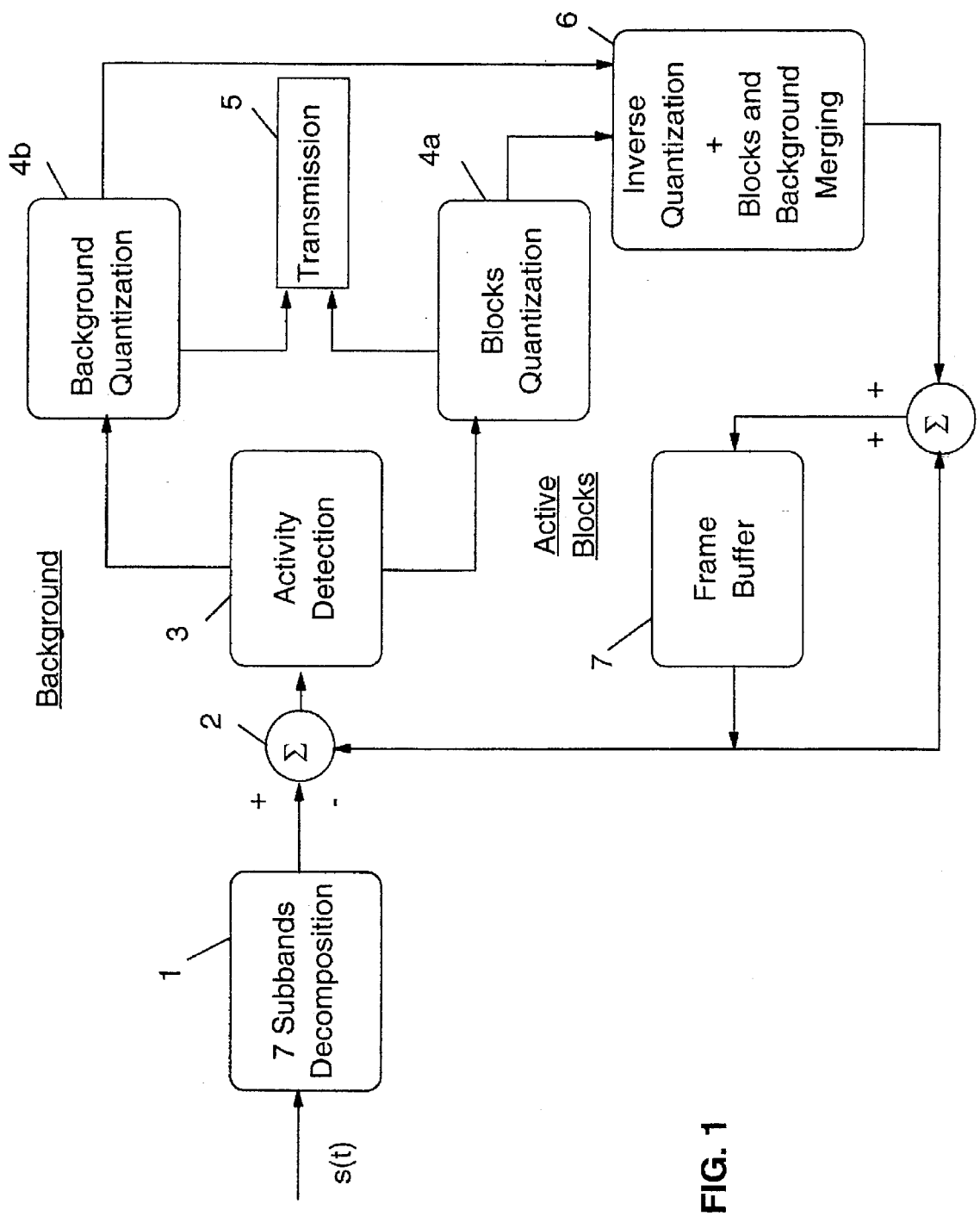
FIG. 1 is a functional representation of the overall structure of the subband coding scheme of the invention.

Represented in FIG. 1 is a simplified functional representation of the overall structure of the subband coding scheme of this invention.

Each input image frame S(t) is first split into several frequency subbands through a tree structured filter bank (1). Then in order to remove interframe time redundancy, a Differential Pulse Code Modulation (DPCM) loop is used and the predicted subband images are subtracted from the incoming subband images to give the current prediction error images (2). Activity is detected in each error prediction image (3) and active blocks are separated from background and quantized separately (4a, 4b). Quantized signals are then transmitted (5) and simultaneously submitted to inverse quantization and active blocks and background merging (6). Frame buffer (7) provides a one image delay, which is used to generate the predicted subband images, at time t−1, that are subtracted from the incoming subband images to give the prediction image errors.

The method for subband coding video signals will now be described in a more detailed manner.

Assume the original signal obtained by scanning the input image is a two-dimensional array of pixels each coded with 8 bits (value between zero and 255) arranged into X columns and Y rows (or lines). Filtering is performed as follows, for the subband splitting.

Each low-pass filtered component Lp(i,j) is computed for subband splitting, for instance:

$$Lp(i,j) = \left( \left( \sum_{k=0}^{m} CoefL(k) * Image(i,j-k) \right) \right) / NormL \quad (1)$$

Wherein:

i and j are respectively row and column indexes.

CoefL are low-pass filter coefficients m+1 is the number of filter coefficients

Image(i,j) is the value of the (i,j) located image sample (pixel)

NormL is a so-called low-pass scaling factor operating a level normalizing operation.

and * stands for the multiplication symbol.

In a preferred embodiment, the following values have been selected:

m=1

NormL=2

CoefL (0,1)=1,1

High-pass components Hp(i,j) are similarly computed according to the following expression:

$$Hp(i,j) = \left( \left( \sum_{k=0}^{n} CoefH(k) * Image(i,j-k) \right) \right) / NormH \quad (2)$$

Wherein:

CoefH are high-pass filter coefficients n+1 is the number of filter coefficients Image(i,j) is the pixel at location (i,j)

NormH is a scaling factor operating a normalizing operation on high-pass filtered signal components.

In a preferred embodiment:

n=1

NormH=2

CoefH(0,1)=1, −1

For a more detailed definition of the filter coefficients, one may refer to an article by A. Croisier, D. Esteban and C. Galand, entitled: "Perfect channel splitting by use of interpolation, decimation, tree decomposition techniques", Int. Conf. on Information Sciences/Systems, Patras, August 1976.

Figure 2:
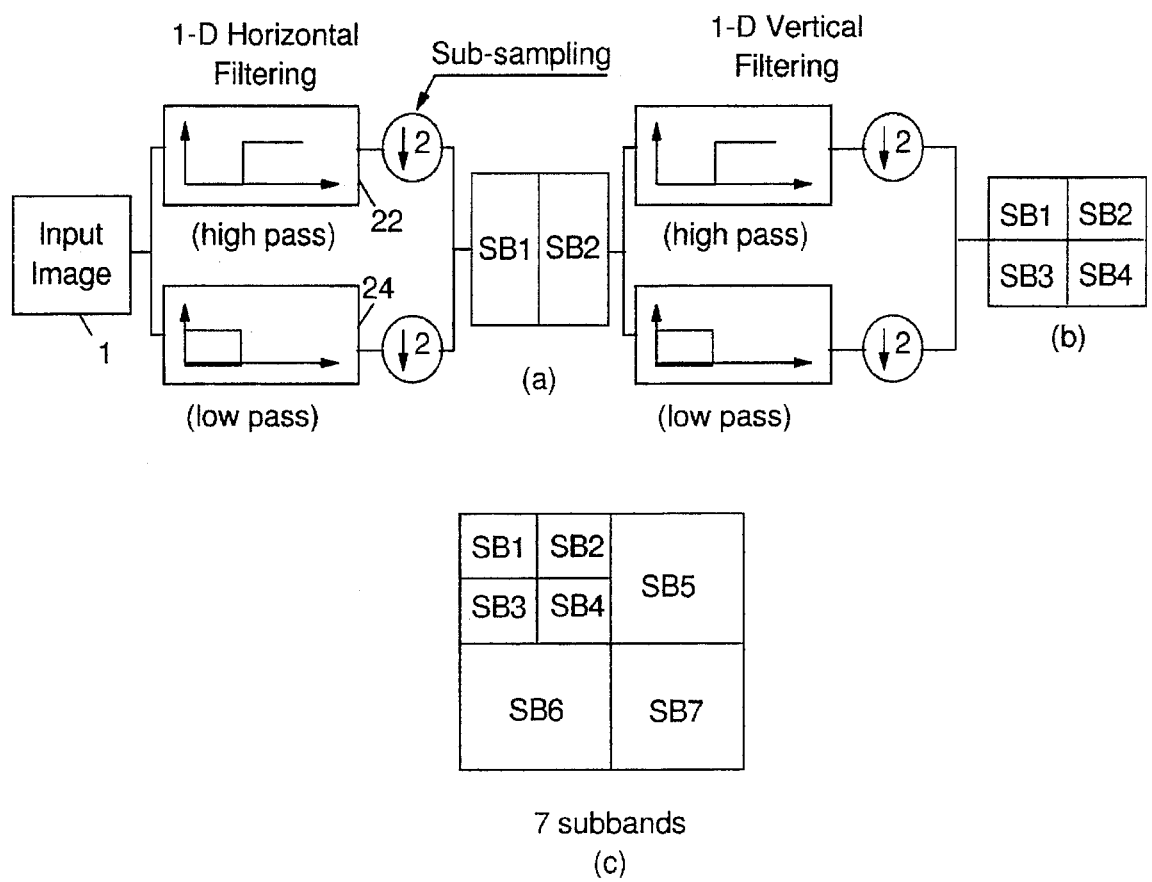
FIG. 2 is a block diagram of the subband decomposition.

A more detailed description of the filtering operations, explaining the vertical and horizontal filtering, is represented in the block diagram of FIG. 2. Let us assume first that the original frame is scanned. The resulting signal is horizontally filtered through both a high-pass filter (22) and a low-pass filter (24). Each filtered signal is sub-sampled by dropping one out of two samples of each filter output to keep even the overall amount of information throughout the filtering. The low-pass filtered signal is stored in a storage location SB1(a), while the high-pass filtered signal is stored in SB2(a). One has now two subband images SB1(a) and SB2(a) herein referred to as sub-images SB1(a) and SB2(a). At the next stage of the tree structured filter bank, the two sub-images SB1(a) and SB2(a) are each split vertically into two subbands, one low-frequency band and one high-frequency band. The sub-image SB1(a) is split into two new sub-images, a low-pass filtered sub-image stored into SB1(b) and a high-pass filtered sub-image stored into SB3(b). Same operations applied to SB2(a) lead to a low-pass filtered sub-image SB2(b) and a high-pass filtered sub-image SB4(b). Accordingly, the resulting frame (b) is a four subband frame. The tree structured filtering may go on and lead to the 7 subbands SB1(c)–SB7(c).

Each estimated subband image is then subtracted from each subband image (DPCM loop), thereby providing a plurality of subband error prediction images.

Baseband (subband1) error prediction image is divided into 2×2 blocks. Each block is said to be active if it contains at least N1 pixels greater than a first threshold TRSH1. Inactive blocks are considered as background.

A graded activity detection is performed on subbands 2 to 4. These subbands are, once again, divided into 2×2 blocks. Two levels of activity are defined:

For a given position, if a block contains at least N2 pixels greater than a second threshold TRSH2 in at least one of the 3 subbands, it is said to be class 2.

For a given position, if a block contains at least N3 pixels greater than a third threshold TRSH3 in at least one of the 3 subbands, it is said to be class 3.

For a given position, if a block is not active it is said to be class 0.

In order to obtain an hierarchical activity detection, the thresholds are chosen so that the activity of the block increases with its class.

All active blocks (class 2 & 3) are considered as active for subbands 2 to 4. Class 0 blocks are considered as background.

For subbands 5 and 6, 4×4 blocks are considered. Correlation with subbands 2 to 4 is used with a block location scale factor (2) to determine blocks activity according to the following algorithm:

Class 0 and 2 blocks are considered as background for these subbands.

Class 3 blocks are considered active and are transposed using a scale factor.

For each subband, active blocks and background are quantized separately. Different quantization schemes may be used:

all scalar quantization;

mixed quantization (using different quantization method according to the subband, e.g. scalar and vectorial).

In the first case all the blocks are quantized with a Laplacian scalar quantizer. As shown in Table I, subband 1 contains the highest amount of information so it has to be encoded precisely. Subbands 2 to 4 contain less information so quantization is less precise. In subbands 5 and 6 background is not encoded. The bit allocation of Table I gives good results.

TABLE I

| Subband | Active Blocks | Background |
| --- | --- | --- |
| 1 | 5 Bits | 1 Bit |
| 2 | 4 Bits | 1 Bit |
| 3 | 4 Bits | 1 Bit |
| 4 | 4 Bits | 1 Bit |
| 5 | 3 Bits | Not encoded |
| 6 | 3 Bits | Not encoded |

Figure 3:
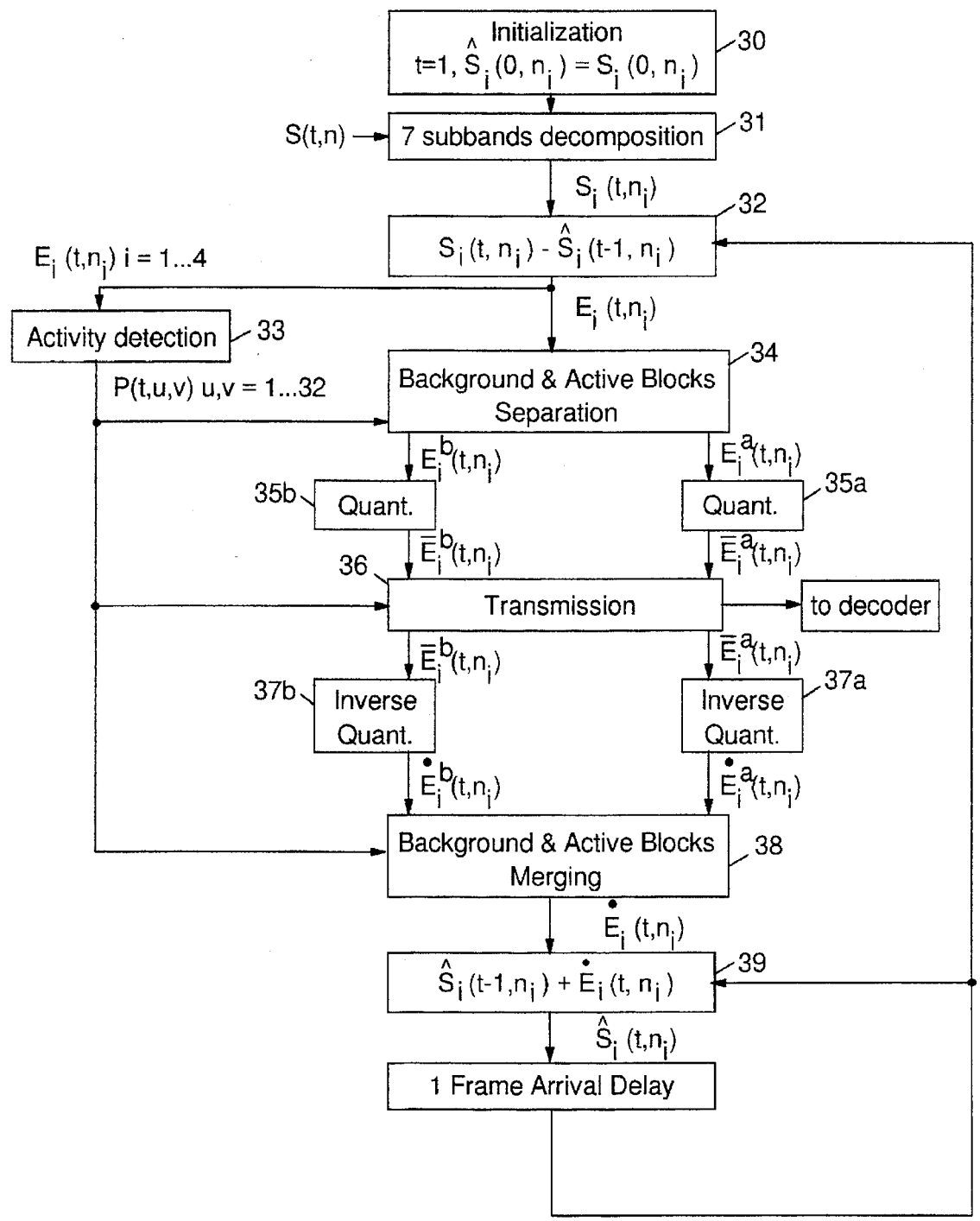
FIG. 3 is a flow chart representing the coding scheme of the invention.

Referring to FIG. 3 and to Table II, the general coder structure can be described as follows:

TABLE II $S(t,n)$ Input image of n pixels at time t $S_i(t,n_i)$ Subband image i of $n_i$ pixels at time t $E_i(t,n_i)$ Error subband image i of $n_i$ pixels at time t $\hat{S}_i(t,n_i)$ Estimated subband image i of $n_i$ pixels at time t $E_i^a(t,n_i)$ Set of active blocks detected into $E_i(t,n_i)$ $E_i^b(t,n_i)$ Set of background blocks detected into $E_i(t,n_i)$ $\overline{E}_i^a(t,n_i)$ Set of coded active blocks detected into $E_i(t,n_i)$ $\overline{E}_i^b(t,n_i)$ Set of coded background blocks detected into $E_i(t,n_i)$ $\dot{E}_i^a(t,n_i)$ Set of decoded active blocks detected into $E_i(t,n_i)$ $\dot{E}_i^b(t,n_i)$ Set of decoded background blocks detected into $E_i(t,n_i)$ $\dot{E}_i(t,n_i)$ Reconstructed error subband image i of $n_i$ pixels at time t after coding and decoding of active and background blocks $b_{i,u,v}(m)$ Mth pixel in block b of position u, v into subband error image $E_i(t,n_i)$ (u=1 ... 32, v=1 ... 32, blocks size is 2×2 for subbands 1 to 4 (so m=1 ... 4) and 4×4 for subbands 5 to 6 (so m=1 ... 16)).

$P(t,u,v)$ Table of block classes for each position u, v in subband images at time t.

$b_{i,u,v}^a$ Active block corresponding to position u, v into subband error image $E_i(t,n_i)$ $b_{i,u,v}^b$ Background block corresponding to position u, v into subband error image $E_i(t,n_i)$ nba1 Counter of number of active blocks in subband 1 nba2 Counter for number of active blocks in subband 2 to 4 nba3 Counter for number of active blocks in subband 5 to 6

N1,N2,N3 Fixed values for active blocks detection (minimum numbers of pixels for activity state consideration TRSHx Fixed values for active blocks detection (Thresholds)

Initialization: (30) The estimated subband image at time 0, $\hat{S}_i(0, n_i)$ is initialized with the 7 decomposed subbands of input image at time 0, S(0,n).

Subband decomposition of input image: (31). The input image S(t,n) is decomposed into seven subbands using QMF filters. The result is stored in $S_i(t,n_i)$.

Prediction error computation: (32). The result is stored in $E_i(t,n_i)$.

Activity detection: (33). A graded activity detection is performed on subbands 1 to 4 of the prediction error subband image. The result is stored in table P(t,u,v).

Background and active blocks separation: (34). According to the results given by the activity detection algorithm active blocks and background are separated for each subband.

Quantization: (35a) and (35b). Active blocks and background are separately quantized with a given method (e.g. scalar or vectorial). The number of levels applied depends on the activity (background or active block) and on the subband number.

Transmission: (36). The quantized samples and the block class array are transmitted to the decoder.

Inverse quantization: (37a) and (37b). This is exactly the inverse of the quantization step.

Background and active blocks merging: (38). According to the results given by the activity detection algorithm, the decoded active blocks and background are merged for each subband.

Estimated subband image computation: (39).

Figure 4:
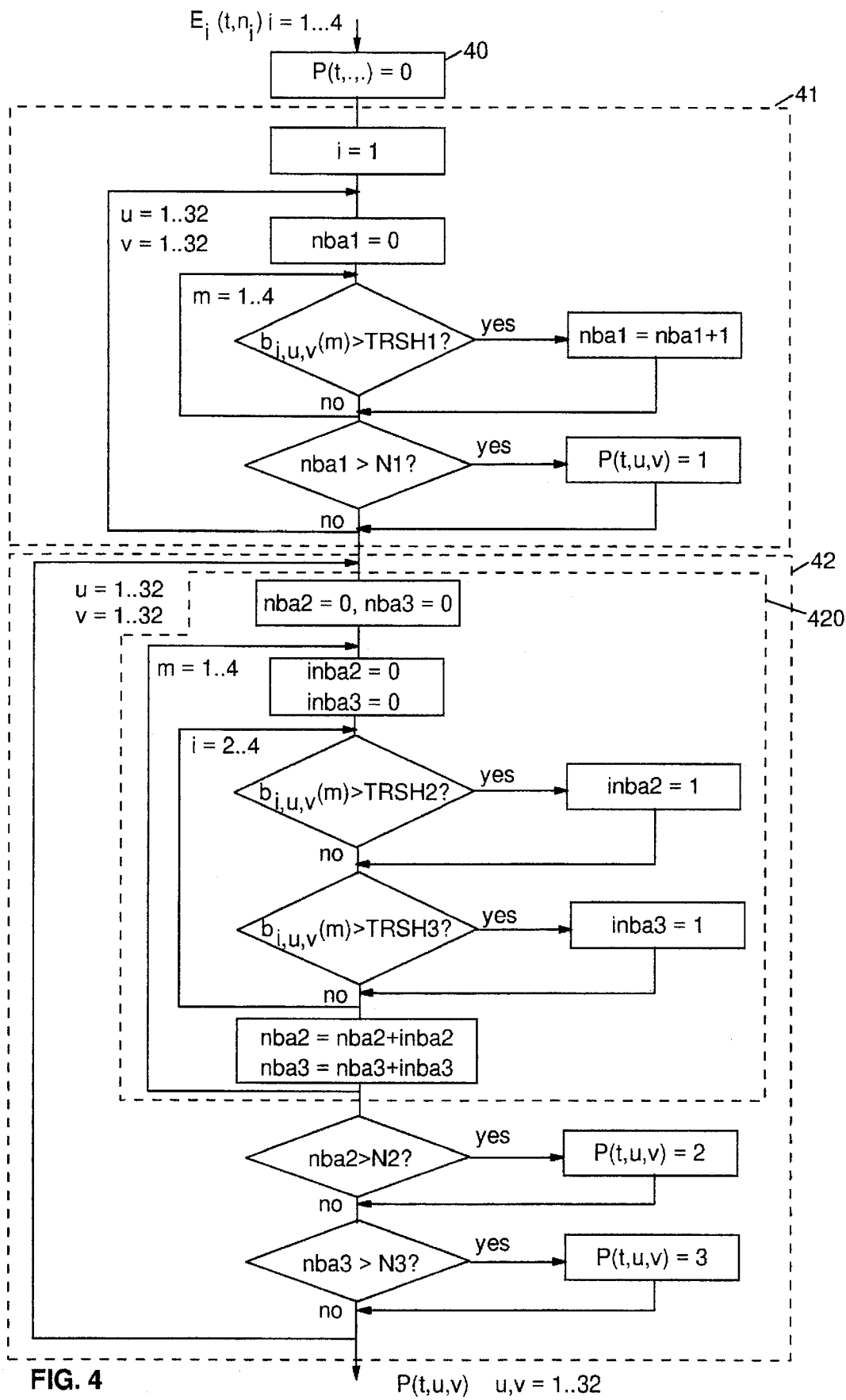
FIG. 4 to 6 are flow charts representing the principal operations of the coding scheme of the invention.

Referring now to FIG. 4, the activity detection algorithm will be described. The subbands 1 to 4 of the prediction error image split into 7 subbands are input.

The block class table P(t,.,.) is initialized to 0 (40).

The first class block detection is performed (41). Therefore, for each block of subband 1, the number of pixels having values greater then TRSH1 is counted. If the current block contains at least N1 pixels greater then said threshold this block is set to class 1.

Then classes 2 and 3 block detection is achieved (42). For each block and for each pixel of the current block, the algorithm (420) increments by 1:

counter nba2 if the current pixel is greater then TRSH2 in at least one of the subbands 2 to 4.

counter nba3 if the current pixel is greater then TRSH3 in at least one of the subbands 2 to 4.

If nba2 is greater then N2 then the current block is set to class 2. If nba3 is greater then N3 then the current block is set to class 3.

The output data of the activity detection algorithm is the block class array, namely P(t,u,v).

Figure 5:
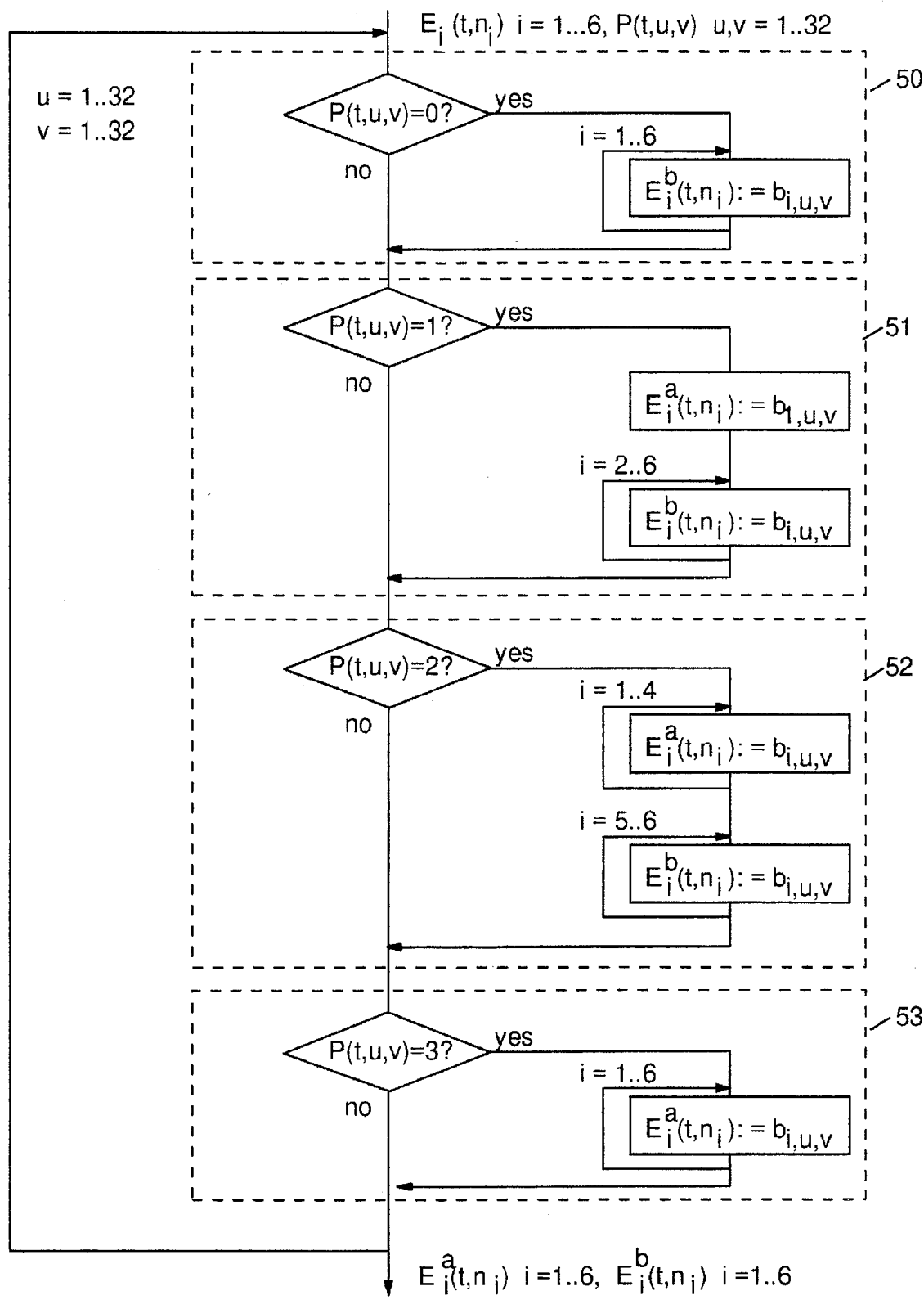

Referring now to FIG. 5, the separation algorithm will be described. The prediction error image split into 7 subbands and the block class array computed by the activity detection algorithm are input.

For each block:

if the current block is class 0, said block is copied for all subbands into $E_i^b(t,n_i)$, i=1 ... 6 (50).

if the current block is class 1, said block is copied into $E_i^a(t,n_i)$ for subband 1 and into $E_i^b(t,n_i)$ i=2 ... 6 for subbands 2 to 6 (51).

if the current block is class 2, said block is copied into $E_i^a(t,n_i)$, i=1 ... 4 for subbands 1 to 4 and into $E_i^b(t,n_i)$ i=5, 6 for subbands 5 and 6 (52).

if the current block is class 3, said block is copied for all subbands into $E_i^a(t,n_i)$, i=1 ... 6. (53).

Notice that, due to the fact that subband 7 is discarded, this subband's blocks are never copied.

The output data of the active blocks and background separation algorithm are the sets containing active and background blocks.

Figure 6:
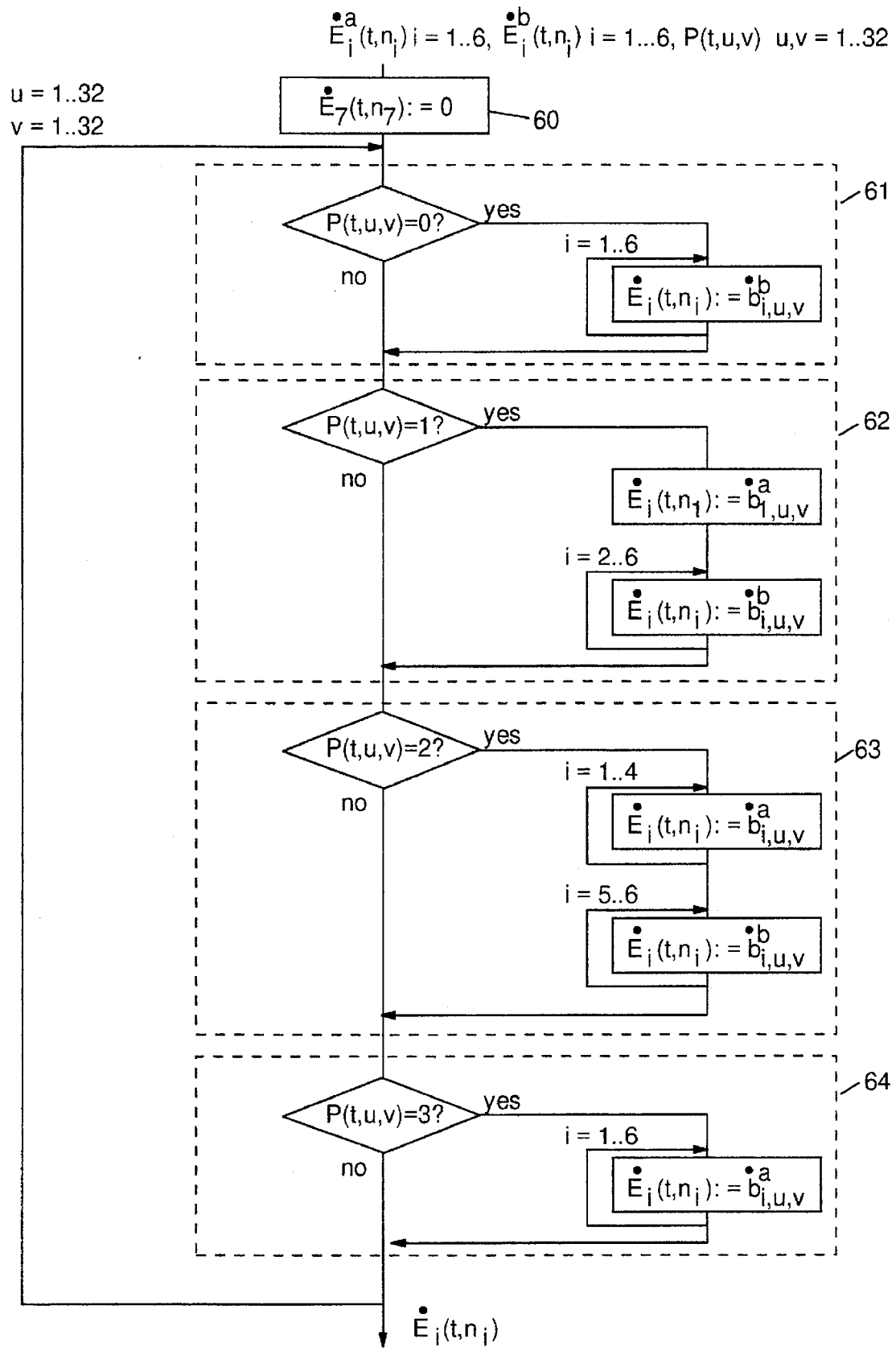

FIG. 6 represents the merging algorithm. It has for input the set of decoded active and background blocks and the block class array computed by the activity detection algorithm.

First, subband 7 of the reconstructed error subband image is set to 0 as this subband was discarded by separation algorithm (60).

The continuation of the algorithm is exactly the inverse of the separation algorithm.

The output data of the active blocks and background merging algorithm is the reconstructed error subband image.

For the reconstruction filters at the receiver, the low-pass and high-pass components of the estimated subband image at time t are computed respectively, according to:

$$\text{Image}_L(i,j) = \left( \sum_{k=0}^{1} RCoefL(k) * Lp(i,j-k) \right) / RNormL \qquad (5)$$

wherein:

RNormL=1

RCoefL(0,1)=1, 1

$\hat{Lp}$ (i,j) reconstructed estimated image at time t, based on Lp (i,j) original image subband and:

$$\text{Image}_H(i,j) = \left( \sum_{k=0}^{1} RCoefH(k) * Hp(i,j-k) \right) / RNormH \qquad (6)$$

wherein:

$\hat{Hp}$ (i,j) reconstructed estimated image at time t based on Mp (i,j) original image subband RNormH=1

RCoefH(0,1)=1,−1

Repeating the subband recombining through the inverse tree-shaped arrangement as shown in FIG. 1, leads to getting back the full bandwidth original image, or more precisely a synthesized image.

Although the description of the preferred embodiment was performed by placing subband decomposition outside the DPCM loop, the proposed method can also be applied by placing subband decomposition inside the DPCM loop.

We claim:

1. A method for digitally coding video signals using subband decomposition of the video signals, said method comprising:

filtering each video signal using a tree-structured filter bank into a plurality of subband video signals;

generating a plurality of predicted subband images from said plurality of subband video signals using a differential pulse code modulation loop;

determining a plurality of subband error prediction images by subtracting from each of said plurality of subband video signals a corresponding predicted subband image from said plurality of predicted subband images;

for each of a first set of said plurality of subband error prediction images, performing an activity detection operation based on a plurality of threshold values to separate each subband error prediction image into a plurality of subband active blocks in which interframe motion is detected, and a plurality of subband background blocks in which no interframe motion is detected; and for each of a second set of said plurality of subband error prediction images, determining a plurality of subband active blocks by correlation with the plurality of subband active blocks in said first set of subband error prediction images;

for each of said plurality of subband error prediction images, quantizing the plurality of subband active blocks and the plurality of subband background blocks separately with a multi-resolution quantizer that encodes each of said plurality of subband active blocks and each of said plurality of subband background blocks using a number of bits associated with encoding each active block and each background block in the corresponding subband wherein each video signal is filtered into seven subband video signals and said activity detection step comprises:

performing an activity detection step on subband one using a first plurality of threshold values to determine the active blocks and background blocks in said subband one; and performing a joined activity detection on subbands two to four using a second plurality of threshold values to determine the active blocks and background blocks in said subbands two to four, wherein a block is determined to be active if it is active in at least one of subbands two to four.

2. The method for coding said video signals according to claim 1, wherein said filtering includes successively decomposing said each video signal into a low-pass filtered component comprising samples Lp(i,j) and a high-pass filtered component comprising samples Hp(i,j) with:

$$Lp(i,j) = \left( \sum_{k=0}^{m} CoefL(k) * \text{Image}(i,j-k) / NormL \right)$$

and $$Hp(i,j) = \left( \sum_{k=0}^{n} CoefH(k) * \text{Image}(i,j-k) / NormH \right)$$

wherein:

CoefL and CoefH are respectively predefined low-pass and high-pass filter coefficients, m and n are predefined numbers of filter coefficients, Image (i,j) are image pixels located at coordinates i,j, wherein i is the row index and j the column index, NormL and NormH are predefined scaling factors.

3. The method for digitally coding video signals according to claim 1 or 2 wherein each of said subband video signals are sampled to keep the overall sampling rate even throughout the filtering step.

4. The method according to claim 1 wherein, according to the correlation existing among different subbands, the same quantizing schemes for active and background blocks are applied to highly correlated subband error prediction images.

5. The method according to claim 4, wherein said plurality of subband active blocks and said plurality of subband background blocks are separately quantized using scalar quantization.

6. The method according to claim 4, wherein said plurality of subband active blocks and said plurality of subband background blocks are separately quantized using vectorial quantization.

7. The method for digitally coding video signals of claim 1 wherein said each video signal is filtered into seven subband video signals and the corresponding subband error prediction images are encoded using five bits for each of the plurality of subband active blocks and one bit for each of the plurality of subband background blocks in the first subband, four bits for each of the plurality of subband active blocks and one bit for each of the plurality of subband background blocks in the second, third and fourth subbands, three bits for each of the plurality of subband active blocks in the fifth and sixth subbands, with no encoding of the subband error prediction image in the seventh subband and the plurality of subband background blocks in the fifth and sixth subbands.

8. The method for digitally coding video signals of claim 1 wherein said step of determining said plurality of subband active blocks in said second set of said plurality of subband error prediction images comprises correlating the active blocks resulting from said joined activity detection step to subbands five and six and applying a scale factor to the results of said correlating step to compensate for the difference in block size between subbands two to four and subbands five and six.

9. A coding system for digitally coding video signals wherein each video signal is scanned to derive a digital video signal represented by an array of pixels, said coding system comprising:

a tree-structured filtering means for decomposing said digital video signal into a plurality of subband video signals;

down sampling means for down sampling each of said plurality of subband video signals by a factor of two after each decomposition step performed by said tree-structured filtering means;

means for generating a corresponding plurality of predicted subband images from said plurality of subband video signals, said means for generating including a differential pulse code modulation loop;

means for determining a plurality of subband error prediction images from said plurality of subband video signals and said corresponding plurality of predicted subband images;

means for performing an activity detection operation based on a plurality of threshold values for each of a first set of said plurality of subband error prediction images to separate each subband error prediction image into a plurality of subband active blocks in which interframe motion is detected and a plurality of subband background blocks in which no interframe motion is detected;

means for determining a plurality of subband active blocks in a second set of said plurality of subband error prediction images by correlation with the plurality of subband active blocks in said first set of subband error prediction images; and means for quantizing each of said plurality of subband active blocks and each of said plurality of subband background blocks using a number of bits associated with encoding each active block and each background block in the corresponding subband wherein each video signal is filtered into seven subband video signals and said means for performing an activity detection operation comprises:

means for performing an activity detection operation on subband one using a first plurality of threshold values to determine the active blocks and background blocks in said subband one; and means for performing a joined activity detection operation on subbands two to four using a second plurality of threshold values to determine the active blocks and background blocks in said subbands two to four, wherein a block is determined to be active if it is active in at least one of subbands two to four.

10. The coding system for digitally coding video signals of claim 9 wherein said means for determining a plurality of subband active blocks in a second set of said plurality of subband error prediction images comprises:

means for correlating the active blocks resulting from said means for performing said joined activity detection to subbands five and six; and means for applying a scale factor to the results of said correlating means to compensate for the differences in block size between subbands two to four and subbands five and six.

* * * * *